United States Patent [19]

Okuo et al.

[11] 4,341,965
[45] Jul. 27, 1982

[54] COMPOSITE ELECTRODE AND INSULATING WALL ELEMENTS FOR MAGNETOHYDRODYNAMIC POWER GENERATING CHANNELS CHARACTERIZED BY FIBERS IN A MATRIX

[75] Inventors: Takayasu Okuo, Ibaragi; Takaki Masaki; Keisuke Kobayashi, both of Ohtsu, all of Japan

[73] Assignees: Agency of Industrial Science & Technology; Ministry of International Trade & Industry; Toray Industries, Inc., all of Tokyo, Japan

[21] Appl. No.: 248,210

[22] Filed: Mar. 27, 1981

[30] Foreign Application Priority Data

Mar. 31, 1980 [JP] Japan ................... 55-40462

[51] Int. Cl.³ ............................ H02N 4/02
[52] U.S. Cl. ........................ 310/11; 252/504; 252/516; 252/518; 252/520; 252/521; 313/353; 428/294; 428/378; 428/698
[58] Field of Search .......... 252/504, 516, 518, 520, 252/521; 310/11; 428/294, 378, 698; 313/353

[56] References Cited

U.S. PATENT DOCUMENTS

| 3,149,253 | 9/1964 | Luebke | 310/11 |
|---|---|---|---|
| 3,428,834 | 2/1969 | Yerouchalmi | 310/11 |
| 3,475,352 | 10/1969 | Barbier et al. | 310/11 |
| 3,508,087 | 4/1970 | Millet et al. | 310/11 |
| 3,515,913 | 6/1970 | Yerouchalmi | 310/11 |
| 3,531,421 | 9/1970 | Foex | 310/11 |
| 3,617,781 | 11/1971 | Rosa | 310/11 |
| 3,629,049 | 12/1971 | Olcott | 428/294 |
| 3,685,519 | 8/1972 | Blattman et al. | 310/11 |
| 3,738,906 | 6/1973 | Olcott | 428/294 |
| 3,826,707 | 7/1974 | Olcott | 428/294 |
| 3,897,582 | 7/1975 | Olcott | 428/294 |
| 3,900,626 | 8/1975 | Brennan | 428/294 |
| 3,914,500 | 10/1975 | Brennan et al. | 428/378 |
| 3,953,647 | 4/1976 | Brennan et al. | 428/378 |
| 3,960,577 | 6/1976 | Prochoyka | 252/504 |
| 3,993,602 | 11/1976 | Prochoyka | 252/504 |
| 4,096,297 | 6/1978 | Pappis et al. | 428/698 |
| 4,128,776 | 12/1978 | Boquist et al. | 310/11 |

Primary Examiner—James C. Cannon
Attorney, Agent, or Firm—Oblon, Fisher, Spivak, McClelland & Maier

[57] ABSTRACT

A composite element comprises a matrix composed of at least one member selected from the group consisting of oxides, carbides, nitrides and borides and a fibrous material made of at least one member selected from the group consisting of carbon, graphite, oxides, carbides, nitrides and borides. A plurality of composite elements are used as the electrode wall or insulating wall constituting an MHD power generating channel.

113 Claims, 15 Drawing Figures

COMPOSITE ELECTRODE AND INSULATING WALL ELEMENTS FOR MAGNETOHYDRODYNAMIC POWER GENERATING CHANNELS CHARACTERIZED BY FIBERS IN A MATRIX

BACKGROUND OF THE INVENTION

This invention relates to composite elements suitable for use in the generating channels of the magnetohydrodynamic (MHD) power generator.

The generating channels mentioned above are exposed to a high-temperature, high-speed current of combustion gas plasma containing seed compounds.

The electrode walls and insulating walls respectively of an electrode material and insulating material which make up the aforementioned generating channels, therefore, are required to possess the following properties.

(a) Properties essential for both walls

Thermal resistance: The channels are classified by their working temperatures into the three types: (i) Cold channels operated at temperatures not exceeding 1000° K., (ii) semi-hot channels operated at temperatures within the range of from 1500° to 1800° K. and (iii) hot channels operated at temperatures exceeding 1800° K. Of these types, the channels of the semi-hot type are held to be advantageous from the standpoints of thermal efficiency and service life. To demonstrate their merits, they are required to offer ample thermal resistance at temperatures within the stated range.

Thermal shock resistance: Since the thermal stresses exerted upon the channels during the steady and transient states of operation are conspicuous, the channels are required to offer sufficiently high thermal shock resistance to withstand the thermal stresses.

Corrosionproofness: The channels are required to withstand corrosions caused by high-temperature reactions and electrochemical reactions with potassium, sulfur, vanadium and coal slag.

Mechanical strength at high temperatures: The channels are required to possess as high mechanical strength as possible to retain necessary resistance to fractures due to thermal stresses.

Resistance to plasma: The channels are required to withstand reactions with various kinds of charged particles contained in the high heat flux and to withstand spattering of the plasma.

Resistance to arc discharge: The material of the channels is required to withstand local oxidation, fusion or vaporization even when the electrification between the generating channels and the plasma is effected in the arc mode.

(b) Properties particularly required for electrode material

High electrical conductivity required for conduction of electrons:

High thermoelectron emissivity: If the material of the cathode is incapable of thoroughly releasing electrons, arc discharge occurs between the cathode and the plasma and degrades the electrode.

(c) Property essential for insulating wall material

Ample electric insulating property at high temperatures.

U.S. Pat. No. 4,128,776 discloses an electrode for use in the MHD generator, which comprises a metal-containing refractory ceramic matrix having a melting point of not less than 1000° C. and possessing conductivity, anti-ferromagnetism and resistance to oxidation.

In the semi-hot and hot temperature regions, however, the combustion gas plasma constitutes a slightly oxidation atmosphere. In this atmosphere, the metal contained in the electrode is embrittled. Thus, the electrode cannot be advantageously used in the semi-hot or hot temperature region. Besides, metals offer less resistance to the corrosion due to the potassium compound, for example. In use of the aforementioned electrode, therefore the temperature of the combustion gas plasma has to be lowered and thereby the system per se becomes deficient in thermal efficiency and power-generating efficiency.

SUMMARY OF THE INVENTION

One object of this invention is to provide composite elements for electrode and insulating walls making up the generating channels for use in the MHD power generator capable of withstanding the harsh environment prevailing in the MHD power generation.

To accomplish the object of the present invention described above, there are provided composite elements for electrode and insulating walls, which composite elements comprise a matrix composed of at least one member selected from the group consisting of oxides, carbides, nitrides and borides and a fibrous material made of at least one member selected from the group consisting of carbon, graphite, oxides, carbides, nitrides and borides, the fibrous material being embedded in the matrix and unified with the matrix so as to form a composite.

When the composite elements which are composed of such matrix and fibrous material as described above are adopted for constructing the power generator's channel walls, the thermal stress generated by the high heat flux under the power-generation conditions is readily dispersed or absorbed in the interface between the fibrous material and the matrix, enabling the channel walls to offer a long life.

The other objects and characteristics of the present invention will become apparent from the further disclosure of the invention to be made hereinbelow with reference to the accompanying drawing.

DESCRIPTION OF THE PREFERRED EMBODIMENT

Figure 1:
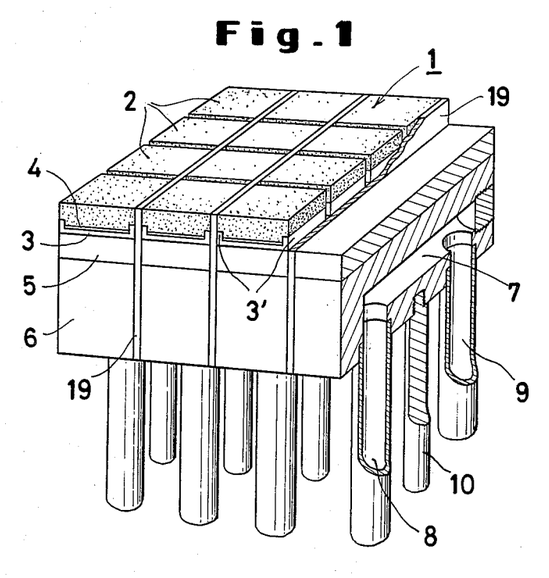
FIG. 1 is a perspective view illustrating one embodiment of the electrode wall constituting the power generating channels of the MHD power generator.
Figure 2A:
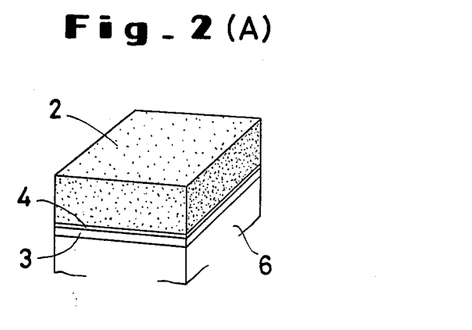
FIG. 2(A) is a perspective view illustrating one embodiment of the electrode elements constituting the electrode wall of FIG. 1.
Figure 2B:
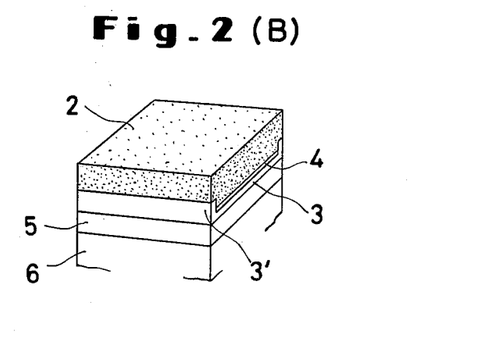
FIG. 2(B) is a perspective view illustrating another embodiment of the electrode elements.
Figure 2C:
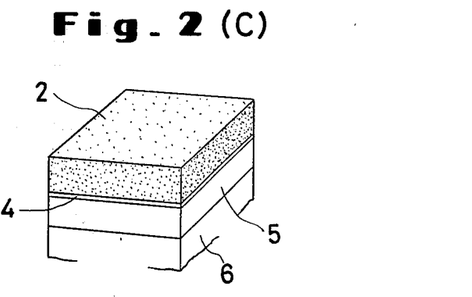
FIG. 2(C) is a perspective view illustrating a further embodiment of the electrode elements.

FIG. 1 is a partially cutaway perspective view illustrating one embodiment of the electrode wall 1 constituting the power generating channels of the MHD power generator. Each composite electrode element 2 has joined thereto, through the medium of a bonding layer 4, a supporting plate 3 (FIG. 2). The composite element 2 which is provided on the bottom surface thereof with such a supporting plate 3 as described above is fastened to a copper cooling block 6 through the medium of a compliant layer 5. Inside the cooling block 6 is formed a cooling water path 7. The cooling water is fed to the path 7 through an inlet pipe 8 connected to one end of the cooling water path 7. While passing the path 7, the cooling water cools the electrode wall 1. The used cooling water is exhausted through an exhaust pipe 9 connected to the other end of the path 7. In the electrode wall, the individual electrode elements falling in one longitudinal row are serially connected electrically. The electric current generated is taken out by the lead bar 10. The adjoining electrode elements are insulated from each other by an insulating plate 19.

Figure 3:
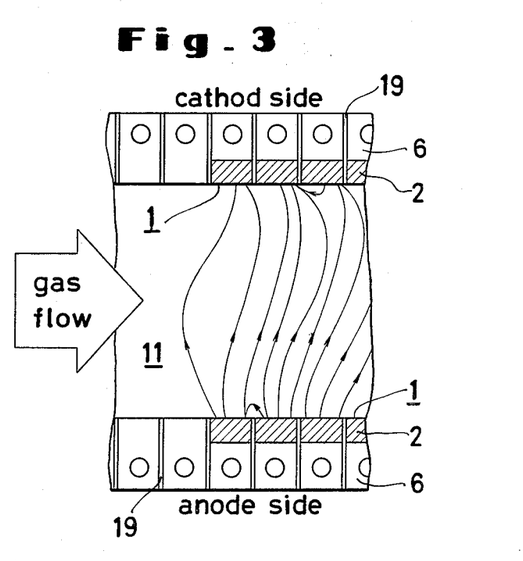
FIG. 3 is an explanatory diagram illustrating the flow of electric current in the power generating channel.

A pair of electrode walls constructed as described above are opposed to each other as illustrated in a sectional view in FIG. 3 and a pair of insulating walls 11 are disposed, one on the upper side edges and the other on the lower side edges respectively of the opposed electrode walls 1 to complete a power generating channel. Within this power generating channel, an electric current occurs and flows from the anode side to the cathode side when the channel interior is kept under a high magnetic field and combustion gas plasma containing seed compounds such as a potassium compound is fed into the channel at a high rate of speed.

This invention relates to the composite elements which form the surfaces of the electrode walls and the insulating walls exposed to the combustion gas plasma.

First, the electrode elements which are destined to undergo the severest working conditions will be described.

The composite electrode element which is to function as the MHD channel electrode of the present invention is composed of a matrix formed of at least one member selected from the group consisting of oxides, carbides, nitrides and borides and a fibrous material formed of at least one member selected from the group consisting of carbon, graphite, oxides, carbides, nitrides and borides. By "fibrous material" is meant a material in the form of fiber, filament, non-woven fabric, mat or whisker.

Examples of oxides which are usable for the matrix of the present invention include $ZrO_2$ systems, $CeO_2$ systems, MgO systems and complex oxide systems as enumerated below. The numerals given in the parenetheses are mol percents of the composite systems indicated.

$ZrO_2$ systems:
$ZrO_{2(90-97)}$—$Y_2O_{3(10-3)}$,
$ZrO_{2(75-92)}$—$Y_2O_{3(10-3)}$—$CeO_{(15-50)}$,
$ZrO_{2(30-92)}$—$Y_2O_{3(10-3)}$—$CeO_{2(60-5)}$,
$ZrO_{2(40-87)}$—$CeO_{2(40-5)}$—$CaO_{(20-8)}$,
$ZrO_{2(80-92)}$—$(MgO\text{-}CaO)_{(20-8)}$ The composite electrode element which uses a $ZrO_2$ system in its matrix excels in resistance to corrosion caused by potassium or a potassium compound being used as the seed compound and possesses a high melting point and, therefore, is particularly suitable for use in the semi-hot temperature region. Addition of a different oxide to the $ZrO_2$ as shown above serves to preclude possible fracture due to the crystal transformation of $ZrO_2$ and to enhance the conductivity for electrons.

$CeO_2$ systems:
$CeO_{2(15-80)}$—$ZrO_{2(85-20)}$,
$CeO_{2(60-90)}$—$Ta_2O_{5(40-10)}$,
$CeO_{2(20-50)}$—$ZrO_{2(70-48)}$—$Ta_2O_{5(10-2)}$ The composite electrode element which uses a $CeO_2$ system in its matrix exhibits high conductivity for electrons at high temperatures and, therefore, suffers little from degradation or damage by electric current and is suitable for use in the semi-hot temperature region. Addition of a different oxide thereto serves to enhance its oxidation resistance and chemical corrosion resistance.

MgO systems:
MgO, $MgO_{(70-90)}$—$CaO_{(30-10)}$,
$MgO_{(70-95)}$—$Al_2O_{3(30-5)}$,
$MgO_{(85-97)}$—$Fe_2O_{3(15-3)}$,
$MgO_{(80-93)}$—$ZrO_{2(20-7)}$ The composite electrode element which uses a MgO system in its matrix excels particularly in resistance to chemical corrosion in the semi-hot temperature region and, further, exhibits a high thermal conductivity. This element, therefore, can be made in a thickness three times the thickness of the element using a $ZrO_2$ system.

Complex oxide systems:
$Al_2O_{3(70-90)}$—$(Fe_2O_3\text{-}SiO_2)_{(30-10)}$,
$MgO_{(60-80)}$—$(Al_2O_3\text{-}Fe_2O_3\text{-}SiO_2)_{(40-20)}$,
$MgO_{(70-90)}$—$Si_3N_{4\ (30-10)}$,
$MgO_{(80-95)}SiC_{(20-5)}$,
$(ZrO_2\text{-}MgO)_{(80-95)}$—SiC or —$C_{(20-5)}$,
$(ZrO_2\text{-}CeO_2)_{(80-95)}$—SiC or —$C_{(20-5)}$,
$(ZrO_2\text{-}CaO\text{-}MgO)_{(80-95)}$—SiC or —$C_{(20-5)}$ The composite electrode element which uses a complex oxide system shown above in its matrix enjoys improved resistance to the slag.

The composite electrode element which uses a carbide in its matrix exhibits high thermal shock resistance due to high thermal conductivity. Thus the element can be made in an increased thickness and, therefore, to be given enhanced mechanical strength. Examples of carbides useful for this purpose include SiC, TaC and ZrC.

The element which is obtained by using $Si_3N_4$ as a nitride in the matrix thereof possesses a high thermal shock resistance due to a low thermal expansion coefficient. When this element is fastened to the cooling block, therefore, it permits omission of the otherwise indispensable incorporation of a compliant layer.

By using a boride in the matrix, there is obtained an electrode element possessing properties similar to the properties of the element using a carbide. Examples of borides useful for the purpose include $ZrB_2$, $HfB_2$ and $TiB_2$.

The materials for the matrix indicated above can be used either singly or in various combinations. When they are used in combinations, the electrode elements consequently obtained are allowed to make the most of the characteristic properties possessed by the individual materials involved. When SiC is added in an amount within the range of from 5 to 20 vol% to the $ZrO_2$—$Y_2O_3$ system, for example, the electrode element to be produced is improved in electron conductivity and thermal conductivity. Various combinations of materials for the matrix touched upon above are shown in Table 1.

TABLE 1

| Main matrix | Additive | Amount of addition (vol %) | Effect of addition |
|---|---|---|---|
| $ZrO_2$—$Y_2O_3$ system | C | 5 to 20 | Improvement in electron conductivity |
| " | TiN | " | Improvement in electron conductivity and thermal conductivity |
| " | $ZrB_2$ | " | Impartment of thermo-electron emissivity and prevention of damage due to arc generation |
| $ZrO_2$—$CeO_2$ system | SiC | " | Improvement in thermal conductivity and thermal shock resistance |
| " | $SiN_4$ | " | Same as above |
| $ZrO_2$—CeO—$Y_2O_3$ system | C | " | Improvement in thermal conductivity |
| $ZrO_2$—MgO system | C | " | Impartment of electron conductivity |
| " | SiC | " | Same as above |
| MgO | TiN | " | Same as above |
| " | SiC | " | Same as above |
| " | C | " | Same as above |

When an oxide such as $Y_2O_3$, MgO, CaO or MgO—CaO is added to the $ZrO_2$ system, the electrode element obtained is improved in stability at high temperatures when the amount of addition is large or in thermal shock resistance when the amount of addition is small.

Now, the fibrous material which is used in the production of the composite electrode element will be described.

First, examples of the oxides suitable for use with the fibers, filaments, non-woven fabric or mat include the $CeO_2$ system and the complex oxide system indicated below.

$CeO_{2(30-70)}$—$ZrO_{2(70-30)}$ or $CeO_{2(20-60)}$—$ZrO_{2(60-30)}$—$Y_2O_{3(20-10)}$

Examples of carbide, nitrides and borides suitable for use with the fibers, filaments, non-woven fabric or mat include TiC, TaC, WC, ZrC, TiN, B, $ZrB_2$, $HfB_2$ and $TiB_2$.

Carbon or graphite may also be used in the form of fiber as the fibrous material.

Examples of nitrides and carbides suitable for use with whiskers as the fibrous material include TiN and SiC, $Nb_2C$ and $B_4C$.

Fibers suitable as the aforementioned fibrous material include milled fibers, meaning short fibers about $20\mu$ to 300 mm in length. The diameter of the fibrous material is variable with the particular type of fibers involved. In the case of fibers of oxide, carbon, graphite or carbide, for example, the diameter is in the range of from 5 to 50 $\mu m$.

Whiskers as the fibrous material for the purpose of this invention are needle-shaped or bar-shaped objects 50 $\mu m$ to 3 mm in length and $10\mu$ to 300 $\mu m$ in outside diameter.

The various fibrous materials mentioned above may be added to the matrix independently or, optionally, two or more such fibrous materials differing in quality or two or more fibrous materials differing in form may be added in varying combinations.

When SiC fibers and TiN fibers are added together, for example, the composite electrode element to be produced enjoys high electric conductivity and is suitable for use in the semi-hot temperature region. When TiC, WC or TaC fibers and TiN or TaN fibers are incorporated simultaneously, the composite element to be obtained enjoys improvement in its wetting property. When the matrix incorporates carbon fibers or TiN fibers in combination with $Si_3N_4$ or SiC whiskers, the electrode element produced is improved in thermal shock resistance and mechanical strength.

Although the proportion of the fibrous material incorporated in the composite electrode element is to be determined in due consideration of the shape and kind of the particular fibrous material adopted and the working environment of the electrode, it is generally selected within the range of from 5 to 40% by volume. If the amount of the fibrous material is less than 5% by volume, the incorporated fibrous material scarcely brings about the expected effect of improving the element in electron conductivity, arc resisting property and thermoelectron emissivity. If the amount of the fibrous material added is too large, numerous voids are formed within the produced composite electrode element to degrade the force with which the fibrous material and the matrix are fastened to each other, with the result that the produced composite electrode element suffers loss of thermal shock resistance and mechanical strength. Generally when the amount of the fibrous material added falls within the range of from 5 to 20% by volume, the produced component element enjoys ample bonding force between the fibrous material and the matrix.

The composite electrode elements are each formed in the shape of a plate-like block of a thickness in the range of 2–15 mm and have a square or rectangular lateral cross section with the length of each of the sides falling in the range of 5–50 mm and being larger than the thickness. If the length of each of the sides of the plate-like block is larger than the upper limit of the aforementioned range, the block is apt to be spalled due to the thermal shock. The thickness of the plate-like block is determined by taking into consideration the position where the composite electrode element is to be used and the materials of which the element is composed. If this thickness is larger than 15 mm, however, mechanical strength is reduced and the cooling effect becomes insufficient.

Generally, the fibrous material is uniformly contained in the composite electrode element of the aforementioned shape. The fibrous material may be oriented either in parallel to or at right angles relative to the plate surfaces of the plate-like block thereby further enhancing the mechanical strength. Further, it may be contained in the plate-like block to have its density decreased gradually either in the vertical direction (i.e. from one of the plate surfaces to the other plate surface) or in the lateral direction of the plate-like block. It goes without saying that the fibrous material may have any combination of orientations and density distributions. For example, it may be oriented in parallel to the plate surface with its density decreased gradually in the vertical direction or may be oriented at right angles relative to the plate surfaces with its density decreased gradually in the lateral direction.

Of the substances of which the fibrous material is composed, $Si_3N_4$, MgO, $Al_2O_3$ and $ZrO_2$ have high values of electrical resistivity and SiC, C, TiC, WC, TiN and AlN have low values of electrical resistivity. Any of these substances of high and low resistivities may be contained in the plate-like block so that the density thereof is decreased gradually either from one plate surface to the other plate surface (vertical direction) or from one side surface to the other side surface (lateral direction). Otherwise, the fibrous material having low electrical resistivity may be contained in the plate-like block on one plate surface or one side surface thereof and the fibrous material having high electrical resistivity on the other plate surface or the other side surface side thereof.

When the fibrous material is oriented in parallel to the plate surfaces of the plate-like block, it serves the purpose of precluding such undesirable phenomena such as vertical cracking and spalling which are caused by the thermal shock. When the fibrous material is oriented at right angles relative to the plane surfaces, it serves the purpose of improving the composite electrode element in thermal conductivity and electrical conductivity. When the fibrous material has its density decreased gradually from the plate surface exposed to the combustion gas plasma to the other plate surface, the electrode acquires enhanced strength in the surface region and consequently increased resistance to fracture due to the thermal stress. Conversely, when the fibrous material is densely distributed on the other plate surface which is held in contact with the cooling block side, the other plate surface of the composite electrode element held in contact with the supporting plate is improved in strength and resistance to fracture due to the thermal stress produced by contact with the cooling block.

Generally in the MHD power generating channel, the electric current tends to concentrate on the upstream side of the anode and on the downstream side of the cathode respectively relative to the flow of the combustion gas plasma as illustrated in FIG. 3. Therefore, when the composite electrode element is constructed so that it has a fibrous material of high resistivity contained in one side surface thereof and a fibrous material of low resistivity contained in the other side surface thereof and is used as the anode, the arrangement of the anode having the one side surface disposed on the upstream side relative to the flow of the gas causes the resistivity in the portions wherein the electric current is concentrated to be increased thereby uniformizing the distribution of the current density on the surface of the electrode and, consequently, the distribution of the electrode consumption can be changed from a localized pattern to a thoroughly uniformized pattern, with the result that the life of the electrode is notably lengthened. When the above-mentioned composite electrode element is used as the cathode, substantially the same effects can be obtained by arranging the cathode so that the side surface containing the fibrous material of low electrical resistivity is disposed on the upstream side relative to the flow of the gas.

When non-woven fabric is used as the fibrous material, the distribution of electric current within the electrode can be uniformized and the current and voltage properties of the electrode can be consequently stabilized by having a plurality of non-woven fabrics disposed at fixed intervals in parallel to the plate surfaces of the plate-like block and having the element thus formed disposed within the generating channel so that the plate surface is exposed to the gas plasma.

The fibrous material in the form of mat is used in the same manner as that in the form of non-woven fabric.

When whiskers are used as the fibrous material, the electrode can be protected against damage by having the whiskers distributed within a thickness of about 1–3 mm from the plate surface of the plate-like block which is exposed to the combustion gas plasma and having the element thus formed disposed within the generating channel.

The plate-like block having such non-woven fabric, mat or whisker distributed therein has the remaining portion thereof filled with fibers and/or filaments.

Composite electrode elements having desired characteristics may be obtained by suitably selecting or, if necessary, suitably combining the methods for the arrangement of the fibrous material in the matrix and the kinds and forms of the fibrous material as described above. When a substance of high electrical resistivity is used as the matrix, a substance of low electrical resistivity is incorporated as the fibrous material into the matrix to obtain a composite electrode element. Conversely, when a substance of low electrical resistivity is used as the matrix, any substance may suitably be selected as the fibrous material without reference to the degree of electrical resistivity.

By simultaneously disposing the fibrous material in one direction within the matrix and subjecting the resultant composite to the sintering process, and then varying the direction in which the sintered composite is cut, there are obtained either composite elements in which the fibrous material is arranged parallelly to the plate surface or composite elements in which the fibrous material is arranged perpendicularly to the plate surface.

Similarly, by simultaneously disposing the fibrous material within the matrix so as to have its density decreased gradually from one surface to the other surface of the matrix and subjecting the resultant composite to sintering process, and then varying the direction in which the sintered composite is cut, there are obtained composite electrode elements having the density of the fibrous material decreased gradually in the direction of either the thickness or the width of the composite electrode elements.

The composite is completed as an electrode by any of the known methods such as, for example, sintering method, one directional eutectoid method, chemical vacuum evaporation method, or fusion method. As a typical example, the sintering method adopted for this purpose will be described below.

As the raw material, a composition including a powder of $ZrO_2$—$CeO_2$ system having a $CeO_2$ content of from 25 to 70 mol% and 10 to 30% by volume, based on the total weight of the composition, of carbon fibers 30 $\mu$m in length and 7 $\mu$m in outside diameter is wet mixed in a ball mill for several hours to some tens of hours. The wet mixed composition is dried to expel water and give rise to a mixed powder. Subsequently, the powder is sintered for one to three hours in a high-frequency type induction heating furnace, either in a vacuum or under a neutral atmosphere, under pressure of 200 to 300 kg/cm$^2$ at a temperature within the range of from 1300° to 1500° C. Consequently, there is obtained a sintered carbon-fiber composite.

The sintered composite thus obtained is cut to stated dimensions, to produce composite electrode elements.

The composite element 2 thus obtained is provided on the bottom surface thereof with a supporting plate 3 through the medium of a bonding layer 4 and the supporting plate is soldered to a cooling block 6 through the medium of a compliant layer 5, thereby constituting an electrode module. The supporting plate 3 serves to mechanically retain the composite element 2 and facilitate the cooling effect, has a thickness of 0.3-1.5 mm and is made of Ni, Cu, Cu alloy or noble metal. The bonding layer 4 functions to mechanically attach the supporting plate 3 to the composite element 2, effectively allow radiation of heat and transmit the current generated from the composite element, and is made of Ni, Cu, Cu alloy, metal oxide such as copper oxide ($Cu_2O$, CuO), nickel oxide, etc., or glass frit having electric conductivity. The compliant layer 5 is disposed for the purpose of matching the thermal expansion coefficient on the composite element side to that on the side of the cooling block 6 which is made of Cu, Ni, Ni-Cu or Fe-Ni-Cr and adjusting or controlling the heat resistance thereby preventing the composite element from being spalled due to the thermal stresses and thereby determining the temperature of the composite element. The compliant layer is made of Ni, Ni-Cr, Ni-Cu or noble metal in a porous or dense form, and the thickness and the component metal are determined in accordance with the heat flux. When the composite element is used in a low heat flux or made of a material having low thermal expansion, for example, the compliant layer 5 may be omitted as illustrated in FIG. 2(A).

The supporting plate 3 which is joined to the bottom surface of the element 2 as described above may be provided on the opposite sides thereof with lateral walls 3' as illustrated in FIG. 2(B). The installation of these lateral walls 3', which are desirably disposed in the case of a high heat flux and a high temperature, ensures effective cooling of the electrode element, permits mechanical maintenance of the electrode and guarantees effective leadout of the electric current. In this case, the height of the lateral walls 3' is required to be at least one fourth of the thickness of the electrode element.

Further, the supporting plate may be omitted as illustrated in FIG. 2(C) where the composite element 2 is reliably attached to the compliant layer 5 and is sufficiently cooled.

When the type of the matrix and the type, form, addition ratio and method of arrangement of the fibrous material are suitably selected as described above, the composite elements consequently produced can be advantageously used as sufficiently reinforced electrode wall elements for the MHD power generating channels.

As already pointed out, the composite elements used for the electrodes can be also used in insulating walls, with or without modification or change in the materials of which the matrix and the fibrous material are composed.

Figure 4:
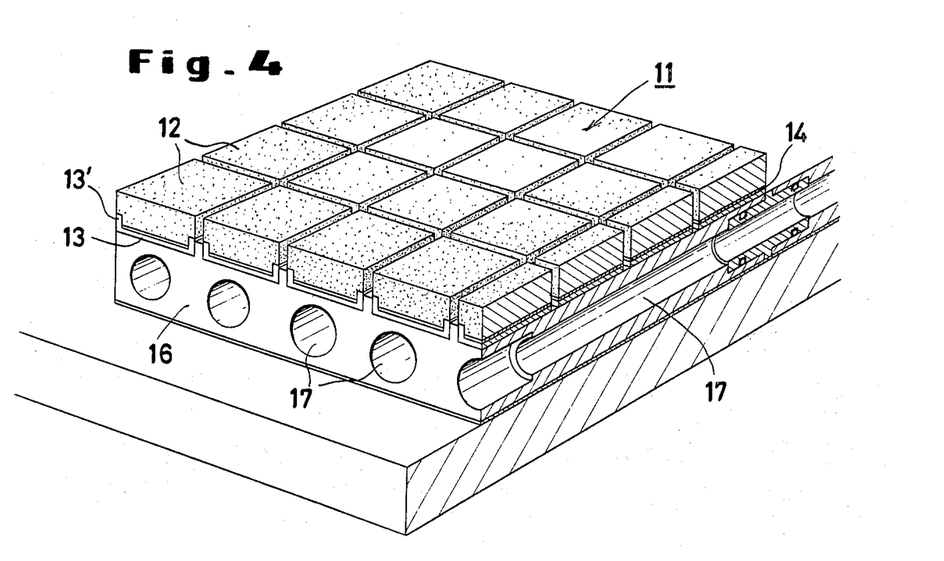
FIG. 4 is a perspective view illustrating one embodiment of the insulating wall constituting the power generating channel.

A typical insulating wall 11 will be described with reference to the diagram of FIG. 4. The composite wall element 12 has a supporting plate 13 of Ni, Cu, Cu alloy or a noble metal joined to the bottom surface thereof through the medium of a bonding layer 14 of Ni, Cu, Cu alloy, metal oxide such as copper oxide ($Cu_2O$, CuO), nickel oxide, etc. noble metal or glass frit. A multiplicity of such composite wall elements 12 fastened to the supporting plates 13 are arranged, as spaced by a stated interval, and soldered onto a cooling block 16 of Cu, Cu-Ni, Ni or Fe-Ni-Cr, to form an insulating wall 11. This cooling block 16 is provided on the interior thereof with cooling water path 17 to cool the elements 12 from the bottom side.

Figure 5:
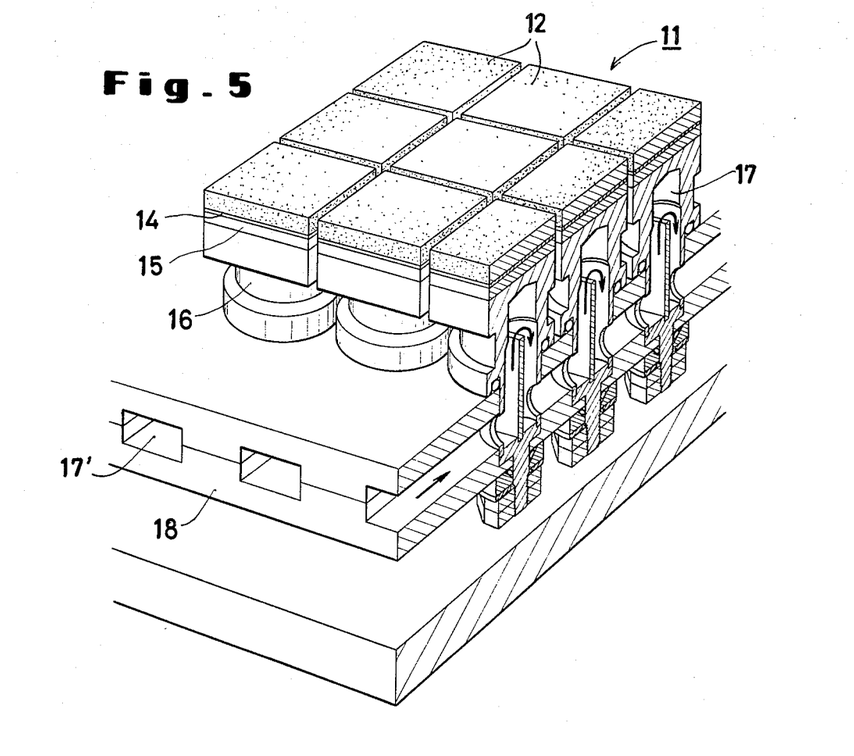
FIG. 5 is a perspective view illustrating another embodiment of the insulating wall.

FIG. 5 illustrates another embodiment of the insulating wall 11. In this insulating wall, the individual composite wall elements 12 are fastened to cooling members 16 through the medium of compliant layers 15 of Ni, Ni-Cr, Ni-Cu or noble metal to form insulating wall modules. The cooling members 16 are provided in the interior thereof with cooling water paths 17. These paths 17 are connected to the cooling water paths 17' provided in the substrate 18 which supports the cooling members 16 in position. They serve the purpose of cooling the bottom surface of the elements 12 through the compliant layers 15.

The composite elements which constitute the aforementioned insulating wall are formed by combining a matrix and a fibrous material in the same manner as in the production of the composite elements for the electrode wall.

The fibrous material is formed of at least one member selected from the group consisting of carbon, graphite, oxides, carbides, nitrides and borides. It is in the form of fibers, filaments, non-woven fabric, mat or whiskers. The matrix is formed of at least one member selected from the group consisting of oxides, carbides, nitrides and borides.

Examples of the oxides usable in the matrix include $ZrO_2$ systems, MgO systems, complex spinel systems and complex oxide system. The $ZrO_2$ systems, the MgO systems and the complex oxide systems used in this case are the same as those used in the matrix for the electrode element. Specific complex spinel systems are $3FeAl_2O_{4(25-75)}$—$Fe_3O_{4(75-25)}$ and $4MgAl_2O_{4(60-80)}$—$Fe_3O_{4(40-20)}$.

The carbides, nitrides and borides used in this case are entirely the same as those used in the matrix of the electrode element.

The aforementioned materials for the matrix may be used singly or in combinations. When they are used in combinations, the produced elements can effectively manifest the characteristic properties of the individual materials involved to advantage. Typical combinations of such materials are shown in Table 2.

TABLE 2

| Main matrix | Additive | Amount of addition (vol %) | Effect of addition |
|---|---|---|---|
| $ZrO_2$—$Y_2O_3$ | $Si_3N_4$ | 10 to 30 | Improvement in thermal shock resistance |
| MgO | " | " | Same as above |
| " | SiC | " | Improvement in thermal conductivity and thermal shock resistance |
| $Si_3N_4$ | $MgO.Al_2O_3$ | " | Improvement in spalling resistance and resistance to slag |

TABLE 2-continued

| Main matrix | Additive | Amount of addition (vol %) | Effect of addition |
|---|---|---|---|
| " | $Fe_2O_3$ | " | Improvement in resistance to slag |
| " | MgO | " | Preclusion of reaction with seed compounds |
| $ZrO_2$—MgO | $Si_3N_4$ | " | Improvement in thermal shock resistance |
| " | SiC | " | Same as above |

Examples of the oxides usable in the fibrous material include $ZrO_2$ systems, complex spinel systems and complex oxide systems which are enumerated below.

$ZrO_2$ systems:
$ZrO_{2(85-92)}$—$CaO_{(15-8)}$,
$ZrO_{2(85-93)}$—$MgO_{(15-7)}$,
$ZrO_{2(90-97)}$—$Y_2O_{3(10-3)}$,
$ZrO_{2(42-85)}$—$(MgO\text{-}CaO)_{(58-15)}$,
$ZrO_{2(85-96)}$—$(CaO\text{-}Y_2O_3)_{(15-4)}$,
$ZrO_{2(85-96)}$—$(MgO\text{-}CaO\text{-}Y_2O_3)_{(15-4)}$ Complex spinel systems:
$3FeAl_2O_{4(25-75)}$—$Fe_3O_{4(75-25)}$,
$4MgAl_2O_{4(60-80)}$—$Fe_3O_{4(40-20)}$ Oxide systems:
$Al_2O_3$, MgO, stabilized zirconia, $SiO_2$,
$MgO_{(5-95)}$—$SiO_{2(95-5)}$ Complex oxide systems:
$MgAl_2O_{4(70-90)}$—$SiO_{2(30-10)}$,
$Al_2O_{3(5-95)}$—$SiO_2$ $_{(95-5)}$ A typical fibrous nitride, $Si_3N_4$ may be cited.

While the fibrous materials cited above are used in the form of fibers, filaments, non-woven fabrics or mats, the fibrous materials which are used advantageously in the form of whiskers are those enumerated below.

Oxide systems:
$ZrO_{2(85-92)}$—$CaO_{(15-8)}$,
$ZrO_{2(85-93)}$—$MgO_{(15-7)}$,
$ZrO_{2(90-97)}$—$Y_2O_{3(10-3)}$,
$ZrO_{2(85-93)}$—$(MgO\text{-}CaO)_{(15-7)}$,
$ZrO_{2(85-96)}$—$(MgO\text{-}Y_2O_3)_{(15-4)}$,
$ZrO_{2(85-96)}$—$(CaO\text{-}Y_2O_3)_{(15-4)}$,
$ZrO_{2(85-96)}$—$(MgO\text{-}CaO\text{-}Y_2O_3)_{(15-4)}$,
BeO, MgO, $Al_2O_3$ When $Y_2O_3$, MgO, CaO or MgO-CaO is added to the aforementioned $ZrO_2$, the resultant mixture enjoys improvement in lasting stability at high temperatures when the amount of the additive is large or improvement in thermal shock resistance when the amount of the additive is small.

Examples of the nitride type fibrous materials advantageously usable in the form of whiskers include $Si_3N_4$ and TiN.

The aforementioned fibrous materials may be used signly or in combination. When a plurality of such fibrous materials are used in combination, the produced element acquires, in combination, the effects proper to the individual fibrous materials involved. Typical combinations of such fibrous materials are shown in Table 3 below.

TABLE 3

| Main fiber | Additive | Amount of addition (vol %) | Effect of addition |
|---|---|---|---|
| $Si_3N_4$ | MgO fiber | 5-20 | Improvement in chemical stability |
| $Al_2O_3$ | $Si_3N_4$ whisker | 5-20 | Improvement in thermal shock resistance and mechanical strength |
| MgO | " | " | Same as above |
| " | SiC fiber | " | Same as above |
| " | TiN fiber | " | Same as above |

The proportion in which the aforementioned fibrous material is incorporated into the composite is variable with the type, shape, etc. of the fibrous material involved. Generally the amount of the fibrous material falls within the range of from 5 to 40% by volume based on the total amount of all the components constituting the composite. If the amount is less than 5% by volume, the added fibrous material hardly manifests its expected effect of improving the thermal shock resistance and mechanical strength. If the amount is greater than 40%, the amount of the matrix is not sufficient and, as a result, voids occur within the resultant composite to weaken the force with which the fibrous material and the matrix are bonded. Thus, the composite tends to be degraded in thermal shock resistance and mechanical strength.

The arrangement or construction of the fibrous material relative to the matrix can be effectively accomplished by following the procedure already specified for the fibrous material to be used in the formation of the composite electrode element, with necessary modifications.

Similarly to the component element for the electrode, the component element comprising the matrix and the fibrous material and intended for use in the insulating wall can be completed by any of the known methods such as, for example, sintering method, one directional eutectoid method and chemical vacuum evaporation method. As a typical example, the sintering method as adopted for the production of the component wall element will be described below.

An electrically fused MgO powder 0.5 $\mu$m in average particle diameter and 99.9% in purity is placed in water, and uniformly stirred in a mixer and consequently converted into a sludge-like mass having a water content of 30 to 40%. Long continuous filaments of $Si_3N_4$ 10 $\mu$m in outside diameter are dipped in the sludge-like mass and then pulled out, to produce $Si_3N_4$ filaments having MgO adhering to the surface thereof. The filaments are arranged in one fixed direction, piled up one over another in a stratified pattern, thoroughly dried and compression molded under pressure of 500 to 2000 kg/cm². Then, the molded mass is subjected to preliminary sintering in an electric furnace and further burnt at 1600° to 1700° C. for two to four hours, to produce a sintered body.

The composite wall elements are obtained by cutting the resultant sintered composite into plate-like blocks which have a thickness in the range of 2-15 mm and have a square or rectangular cross section with the length of each of the sides falling in the range of 10-25 mm.

The insulating wall 11 is constructed by joining supporting plates 13 to the bottom surface of the elements 12 and then arranging the elements on the cooling block 16 in much the same way as illustrated in connection with the electrode elements in FIG. 2(A). The composite wall elements, similarly to those used in the electrode, can be made to function more effectively by providing them with lateral walls 13' of a height at least one fourth of the thickness of the element in due consideration of the heat flux, the mechanical strength and the distribution of the temperature (FIG. 2(B)). Similarly to the case of the composite electrode elements, in this case, the supporting plate may be omitted where reliable attachment between the composite element and the compliant layer is ensured and the compliant layer may be omitted where the composite element is used under a low heat flux or is composed of a material low in thermal expansion.

The composite elements which are advantageously used for the construction of the insulating wall can be obtained by suitably selecting the type of matrix, the type and form of the fibrous material as the reinforcing substance, the proportion of the addition of the fibrous material to the matrix, the method of arrangement of the fibrous material relative to the matrix, etc.

The insulating plates 19 to be interposed between the adjoining electrodes (FIG. 1) are constructed in much the same way as the electrode or insulating wall is constructed, on the sole condition that both the matrix and the fibrous material should be made of electrically insulating substances.

As described in detail above, the present invention comprises combining a matrix formed of at least one member selected from the group consisting of oxides, carbides, nitrides and borides and a fibrous material formed of at least one member selected from the group consisting of carbon, graphite, oxides, carbides, nitrides and borides thereby producing composite elements, and joining the composite elements with other necessary components thereby producing a power generating channel. Since the fibrous material which possesses high resistance to arc discharge can be incorporated in any desired proportion, the produced power generating channel can be given improved resistance to arc discharge. The resistance to corrosion can also be improved: To be specific, since the incorporation of the fibrous material in the substrate promotes the "wetting" in the interface between the fibers and the matrix, the sintering property of the composite element is enhanced to a point where possible corrosion by the infusion of the seed compounds is effectively curbed. Further, the resistance to the combustion gas plasma can be improved because the heat shocks generated owing to the variation in the high thermal input from the gas flow as the heat source to the channel wall are effectively and easily dispersed as constant thermal stress between the fibers and the matrix. Consequently, the damage by the thermal shocks is avoided and the resistance to the gas flow is improved. In the aspect of electric current, the concentration of electric current is avoided and the resistance to arc discharge is improved because the electric current passes along the interstices between the fibers in the matrix. Although the oxide used in this invention has low electron conductivity, the composite element acquires increased electron conductivity because the electroconductive fibrous material can be incorporated as desired. Besides, the thermoelectron emissivity can be improved by allowing the fibers of $ZrB_2$ or $TiB_2$ to be incorporated as required into the matrix. Such a nitride as $TiN$ or $Si_3N_4$ excels in thermal shock resistance. When this nitride is incorporated in the form of fibers into the matrix of a material deficient in sintering property, the resultant composite produces a sintered body of highly dense texture. This sintered body enjoys improvement in strength.

Now, the present invention will be described with reference to working examples.

EXAMPLE 1

A $ZrO_2$ powder 99.9% in purity and $0.1\mu$ in average particle diameter and a $CeO_2$ powder 99.5% in purity and $0.1\mu$ in average particle diameter were mixed in amounts corresponding to a molar ratio of 50:50. In an alumina ball mill, 1 part by weight of the resultant mixture and 2 parts by weight of water were mixed and crushed. Then, the mixed powder slurry removed from the ball mill was dried in an oven at 100° C. for 42 hours to expel water. The dried mixed powder was placed in an electric furnace, calcined in an atmosphere of air at 1400° C. for three hours, to form a solid solution of $ZrO_2$ and $CeO_2$. Subsequently, the solid solution powder was mixed, crushed and dried under entirely the same conditions as those under which the aforementioned mixed powder was obtained, to afford a mixed oxide powder as the material for the matrix. This powder had an average particle diameter of $0.5\mu$.

Separately, there were prepared carbon fibers (milled fibers) measuring 24000 $kg/mm^2$ in Young's modulus, 300 $kg/mm^2$ in tensile strength, $7\mu$ in average fiber diameter and $30\mu$ in average fiber length.

Then, the aforementioned mixed oxide powder and carbon fibers were mixed in amounts such that the carbon fibers accounted for 5% by volume of the whole amount of the materials involved. In an alumina ball mill, 1 part by weight of the resultant mixture and 0.6 part by weight of water were mixed for three hours. The wet mixture was dried in an oven at 100° C. for 24 hours to expel water and afford a molding material.

Then, the molding material was placed to fill a graphite die, then set in a 20-KW high-frequency furnace, heated therein under an atmosphere of nitrogen under pressure of 200 $kg/cm^2$ at a temperature increasing rate of 500° C./hour up to 1400° C., at which temperature it was heated for one hour, to produce a sintered element. In the sintered element which was in the shape of a disc 10 mm in thickness and 60 mm in diameter, the carbon fibers were oriented randomly within planes parallel to the opposite flat surfaces of the disc.

Then, plate-like blocks 15 mm in length, 12 mm in width and 9 mm in thickness were obtained by cutting the sintered element and polishing the cut pieces.

Subsequently, a nickel paste was applied to the bottom face and the opposite lateral surfaces of each of the plate-like blocks, heated further in a furnace under an atmosphere of nitrogen at 900° C. for one hour, to form a deposited nickel layer on the three surfaces. The nickel layers thus formed has an average thickness of $10\mu$. The plate-like blocks were fitted to a copper block 6 through the medium of a nickel support 3 to obtain a test piece (electrode) as illustrated in FIG. 1. (Hereinafter, this test piece will be identified as ZC-5C.)

By following the procedure described above, there were obtained three types of test pieces having carbon fiber contents of 10%, 30% and 40% respectively by volume. They will be identified hereinafter as ZC-10C, ZC-30C and ZC-40C respectively.

Then, the four types of test pieces mentioned above were set in position on the cathode side electrode of the power generating channel of an MHD generator using the heavy oil combustion plasma as the electromagnetic fluid in such a manner that the composite element sides illustrated in FIG. 1 would fall substantially parallel to the direction of the electromagnetic fluid indicated by the arrow and were subjected to test under the following conditions.

| | |
|---|---|
| Burner heat input (MW) | 1.42 |
| Total mass flow (g/s) | 174.5 |
| Mass flux (g/s.cm$^2$) | 9.69 |
| Seeding ratio of potassium (wt %) | 0.57 |
| Running time (hr) (Total steady state) | 20 |
| Mean current density (A/cm$^2$) | 1.0 |
| Electro-surface temperature (°K) (Cathode) | 1500 ~ 1870 |
| Mean heat flux (w/cm$^2$) | 50 |

Figure 6:
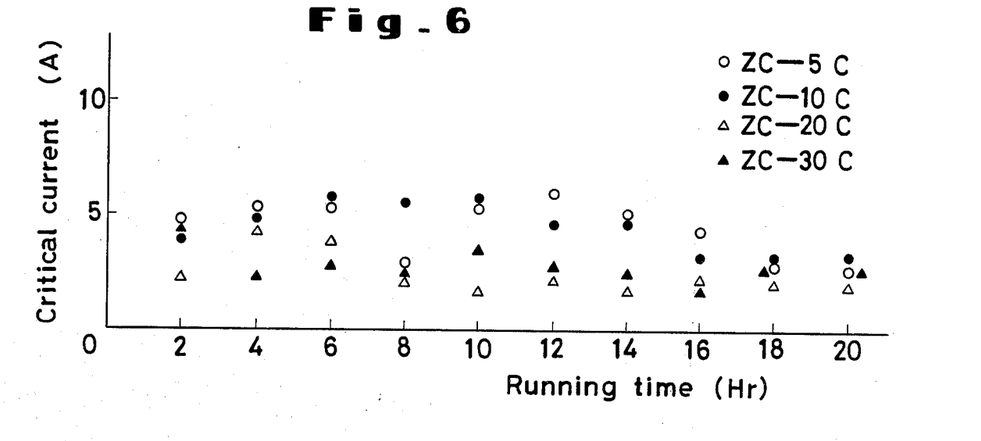
FIG. 6 is a diagram illustrating the relationship between the critical current and the running time of the composite electrode element obtained in Example 1.
Figure 7:
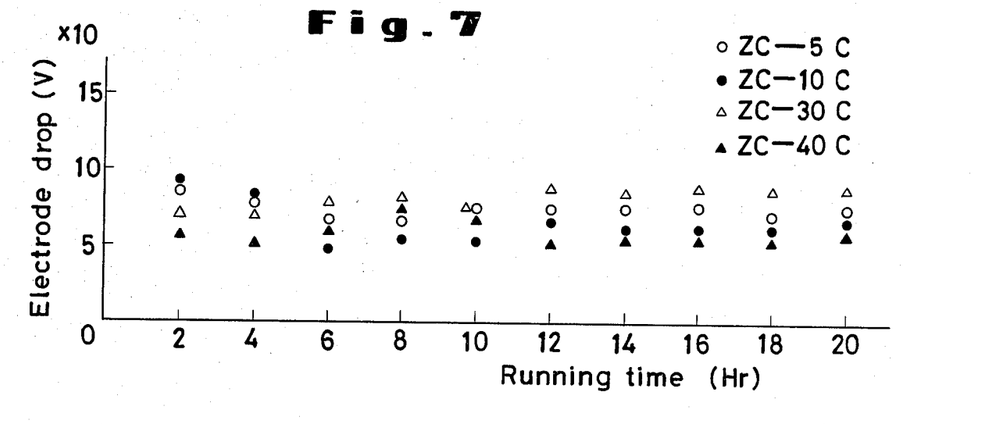
FIG. 7 is a diagram illustrating the relationship between the electrode drop and the running time of the composite electrode element obtained in Example 1.

The test pieces were tested under the conditions shown above for the time-course change of critical current (the upper limit of the electric current uniformly dispersed on the surface of the electrode). The results are shown in FIG. 6. They were also tested for the time-course change of electrode drop. The results are shown in FIG. 7. It is noted from FIGS. 6 and 7 that the test pieces were sufficiently stable with respect to both critical current and electrode drop. The weight loss (mg/cm$^2$·hr) was 30 for ZC-5C, 18 for ZC-10C, 17 for ZC-30C and 43 for ZC-40C. These values of weight loss are all quite small.

EXAMPLE 2

Figure 8:
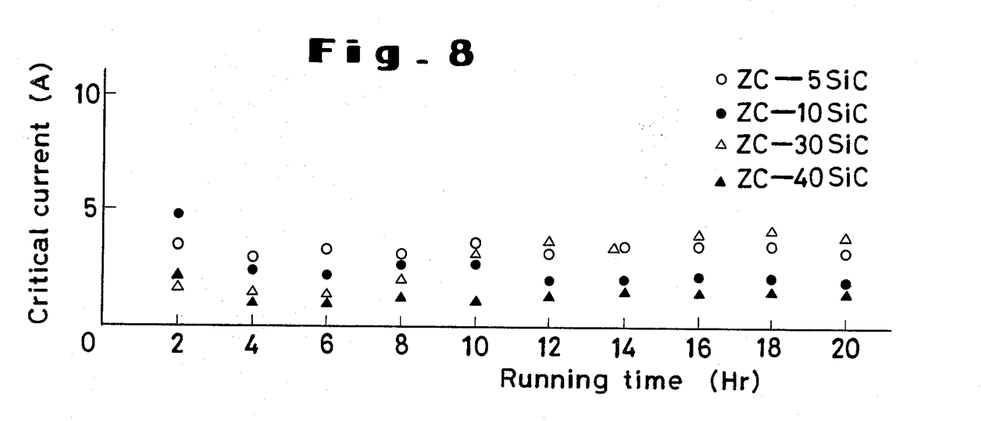
FIG. 8 is a diagram illustrating the relationship between the critical current and the running time of the composite electrode element obtained in Example 2.
Figure 9:
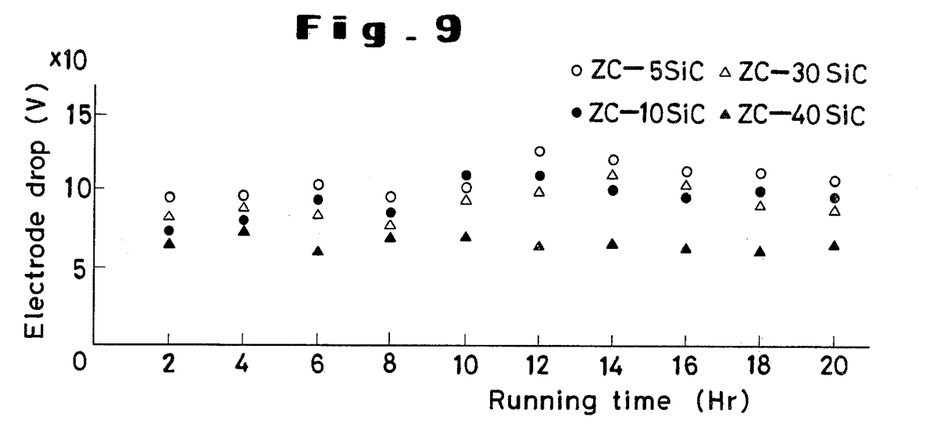
FIG. 9 is a diagram illustrating the relationship between the electrode drop and the running time of the composite electrode element obtained in Example 2.

Four types of test pieces, ZC-5SiC, ZC-10SiC, ZC-30SiC and ZC-40SiC, were prepared by faithfully following the procedure of Example 1, except that the mixing ratio of ZrO$_2$ powder and CeO$_2$ powder was changed to 30:70 and SiC fibers measuring 30000 kg/mm$^2$ in Young's modulus, 400 kg/mm$^2$ in tensile strength, 13$\mu$ in average fiber diameter and 2 mm in average fiber diameter were used in the place of carbon fibers. These test pieces were tested under entirely the same conditions as used in Example 1 for the same items. The results are shown in FIGS. 8 and 9. Similarly to the test pieces of Example 1, the test pieces in this case were highly stable with respect to both critical current and electrode drop. The weight loss (mg/cm$^2$·hr) was 20 for ZC-5SiC, 13 for ZC-10SiC, 10 for ZC-30SiC and 38 for ZC-40SiC. These values of weight loss are smaller than those of Example 1 having the corresponding fiber contents, indicating that the test pieces of this Example were better.

EXAMPLE 3

Figure 10:
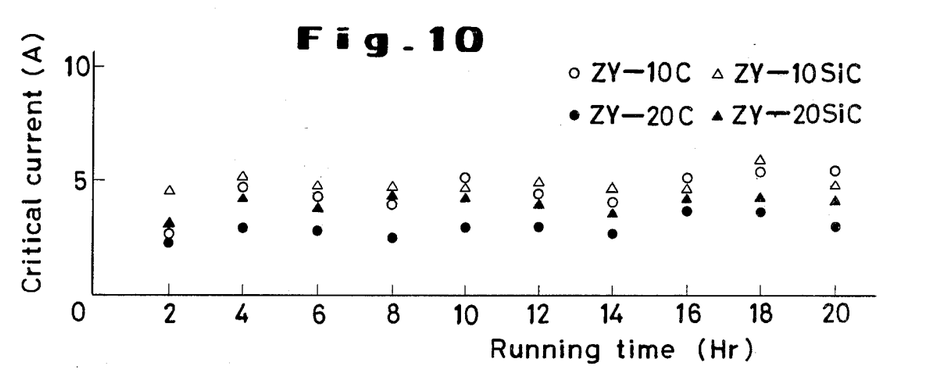
FIG. 10 is a diagram illustrating the relationship between the critical current and the running time of the composite electrode element obtained in Example 3.
Figure 11:
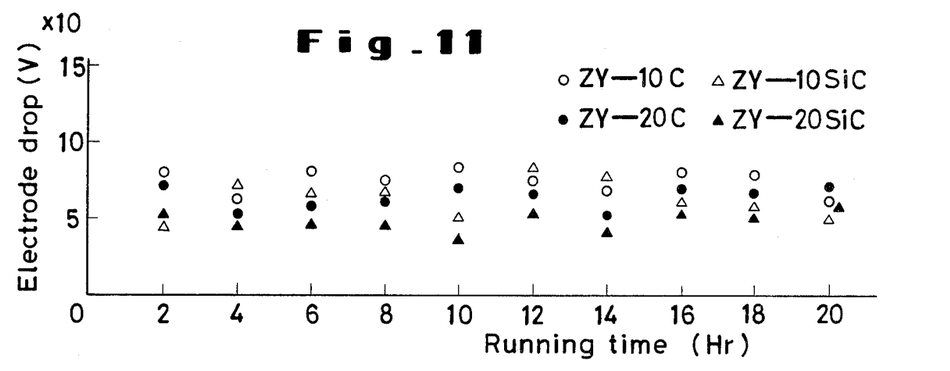
FIG. 11 is a diagram illustrating the relationship between the electrode drop and the running time of the composite electrode element obtained in Example 3.

A Y$_2$O$_3$ powder 99.9% in purity and 0.1$\mu$ in average particle diameter and the same ZrO$_2$ powder as used in Example 1 were mixed in amounts corresponding to a molar ratio of 5:95. By using the resultant mixture and the same carbon fibers and SiC fibers as used respectively in Examples 1 and 2, four types of test pieces were obtained under entirely the same conditions as in Example 1: They were test pieces containing 10% by volume of carbon fibers (ZY-10C), test pieces containing 20% by volume of carbon fibers (ZY-20C), test pieces containing 10% by volume of SiC fibers (ZY-10SiC) and test pieces containing 20% by volume of SiC fibers (ZY-20SiC). Under entirely the same conditions as used in Example 1, these test pieces were tested for the same items. The results are shown in FIGS. 10 and 11. It is seen from these Figures that all these test pieces were sufficiently stable with respect to both critical current and electrode drop. The weight loss (mg/cm$^2$·hr) was 44 for ZY-10C, 37 for ZY-20C, 30 for ZY-10SiC and 52 for ZY-20SiC respectively. These values of weight loss are slightly larger than those obtained in Examples 1 and 2.

EXAMPLE 4

Figure 12:
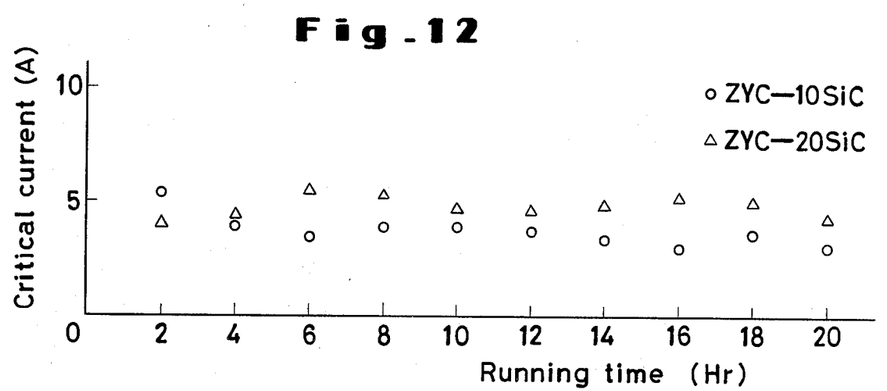
FIG. 12 is a diagram illustrating the relationship between the critical current and the running time of the composite electrode element obtained in Example 4.
Figure 13:
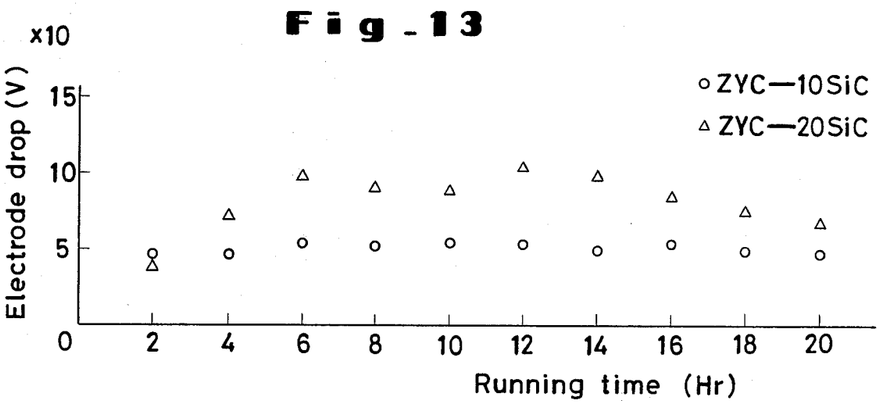
FIG. 13 is a diagram illustrating the relationship between the electrode drop and the running time of the composite electrode element obtained in Example 4.

The same ZrO$_2$ powder, CeO$_2$ powder and Y$_2$O$_3$ powder as used in Examples 1 and 3 were mixed in amounts corresponding to a molar ratio of 75:10:15. By using the resultant mixture and the same SiC fibers as used in Example 2, two types of test pieces were obtained under entirely the same conditions as used in Example 1: They were test pieces containing 10% by volume of SiC fibers (ZCY-10SiC) and test pieces containing 20% by volume of SiC fibers (ZCY-20SiC). These test pieces were tested by following the procedure of Example 1. The results are shown in FIGS. 12 and 13. From the Figures, it is seen that these test pieces gave as good results on critical current and electrode drop as those obtained in Examples 1 through 3. The weight loss was 20 for ZCY-10SiC and 15 for ZCY-20SiC respectively.

EXAMPLE 5

A MgO powder 99.5% in purity and 0.1$\mu$ in average particle diameter and Si$_3$N$_4$ whiskers measuring 45000 kg/mm$^2$ in Young's modulus, 1900 kg/mm$^2$ in tensile strength, 50$\mu$ in average diameter and 300$\mu$ in average length were prepared.

Then, the MgO powder and the Si$_3$N$_4$ whiskers were mixed in amounts such that the whiskers accounted for 5% by volume of the whole amount of the materials involved. By faithfully following the procedure of Example 1 except that the sintering temperature was changed to 1600° C., test pieces (for the insulating wall) were obtained from the resultant mixture. These test pieces will be identified as M-5Si$_3$N$_4$ hereinafter.

In entirely the same manner, three types of test pieces were obtained which contained 10%, 20% and 40% by volume respectively of the whiskers. They will be identified as M-10Si$_3$N$_4$, M-20Si$_3$N$_4$ and M-40Si$_3$N$_4$ respectively.

The four types of test pieces described above were set on the cathode side insulating walls in the power generating channels of the MHD generator of Example 1 and subjected to tests. The manner in which they were fixed in position and test conditions were entirely the same as those of Example 1. The electrode walls used in this case were made of the element identified as ZC-10C in Example 1.

In the test, the test pieces of M-5Si$_3$N$_4$ were observed to sustain small cracks in the surface, with potassium from the seeding material filling such cracks. The test pieces of M-40Si$_3$N$_4$ were observed to sustain parallel peeling in the surface, with potassium detected in fairly large concentrations in the surface and interior regions. Despite such injuries, these test pieces were still in serviceable condition. The test pieces of M-10Si$_3$N$_4$ and M-20Si$_3$N$_4$ were observed to sustain virtually no change in the surface and interior regions, with very little potassium detected therein. The detection of potassium in the test pieces was performed by means of an X-ray microanalyzer. The weight loss (g/cm$^2$·hr) was 12 for M-5Si$_3$N$_4$, 5.2 for M-10Si$_3$N$_4$, 6.0 for M-20Si$_3$N$_4$ and 45 for M-40Si$_3$N$_4$.

EXAMPLE 6

By following the procedure of Example 1 except that a mixed powder obtained by mixing the MgO powder of Example 5 and the $ZrO_2$ powder of Example 1 at a molar ratio of 10:90 was used in the place of the MgO powder of Example 5, the SiC fibers of Example 2 were used in the place of the $Si_3N_4$ whiskers, and the sintering temperature was changed to 1500° C., four types of test pieces were prepared: They were test pieces containing 5% by volume of SiC fibers (ZM-5SiC), test pieces containing 10% by volume of SiC fibers (ZM-10SiC), test pieces containing 20% by volume of SiC fibers (ZM-20SiC) and test pieces containing 30% by volume of SiC fibers (ZM-30SiC).

These test pieces were tested under the same conditions as those of Example 5. In the test, the test pieces of ZM-5SiC were observed to sustain small cracks in the surface, with potassium detected in these cracks. The test pieces of ZM-30SiC were observed to form small waves on the surface, with potassium detected in fairly high concentrations in the surface and interior regions. Nevertheless, all these test pieces were still in fully serviceable condition. In the test pieces of ZM-10SiC and ZM-20SiC, the surface and interior conditions were good and practically no potassium was detected. The weight loss ($g/cm^2 \cdot hr$) was 18 for ZM-5SiC, 4.2 for ZM-10SiC, 7.8 for ZM-20SiC and 10 for ZM-30SiC.

EXAMPLE 7

A mixed powder obtained by mixing the MgO powder of Example 5 and a $Si_3N_4$ powder 99.5% in purity and $0.2\mu$ in average particle diameter in amounts corresponding to a molar ratio of 95:5 was used in the place of the MgO of Example 5. Then, in an alumina ball mill, 1 part by weight of this mixed powder and 2 parts by weight of water were mixed and crushed for 20 hours. The mixed powder slurry removed from the ball mill was dried in an oven at 100° C. for 48 hours to expel water. The resultant dry mixed powder was placed in an electric furnace and calcined in an atmosphere of air at 1400° C. for three hours. The calcined powder was mixed, crushed and dried under entirely the same conditions as those used for the preparation of the aforementioned mixed powder, to obtain a mixed oxide powder intended for the matrix. This powder had an average particle diameter of $0.5\mu$.

Then, by using the same carbon fibers as used in Example 1 and following the procedure of Example 1 except that the sintering temperature was changed to 1700° C. and the sintering time was changed to 2 hours, three types of test pieces were obtained: They were test pieces containing 5% by volume of carbon fibers (SM-5C), test pieces containing 10% by volume of carbon fibers (SM-10C) and test pieces containing 20% by volume of carbon fibers (SM-20C).

Subsequently, the same tests as involved in Example 5 were performed on the test pieces mentioned above. In the test, the test pieces of SM-5C were observed to sustain small cracks in the surface, with potassium detected in the crystal grain boundary. In the test pieces of SM-20C, the surface was slightly degraded and potassium was detected in the surface and interior regions. In the test pieces of SM-10C, although no surface change was detected, potassium was detected slightly. The weight loss ($g/cm^2 \cdot hr$) was 50 for SM-5C, 23 for SM-10C and 35 for SM-20C.

What is claimed is:

1. A composite electrode element for a magnetohydrodynamic power generating channel, comprising a matrix composed of at least one member selected from the group consisting of oxide, carbide, nitride and boride and a fibrous material composed of at least one member selected from the group consisting of carbon, graphite, oxide, carbide, nitride and boride, said fibrous material being embedded in said matrix and unified with said matrix so as to form a composite.

2. The composite electrode element according to claim 1, wherein said fibrous material is in the form of fiber, filament, non-woven fabric, mat or whisker.

3. The composite electrode element according to claim 1, wherein the amount of said fibrous material is 5 to 40% by volume based on the total volume of the composite electrode element.

4. The composite electrode element according to claim 1, wherein the amount of said fibrous material is 5 to 20% by volume based on the total volume of the composite electrode element.

5. The composite electrode element according to claim 1, wherein said fibrous material is made of a $CeO_2$ system or a complex oxide system and is in the form of fiber, filament, non-woven fabric or mat.

6. The composite electrode element according to claim 1, wherein said fibrous material is made of $CeO_2$-$ZrO_2$ in a molar ratio of 30–70:70–30 or $CeO_2$-$ZrO_2$-$Y_2O_3$ in a molar ratio of 20–60:60–30:20–10 and is in the form of fiber, filament, non-woven fabric or mat.

7. The composite electrode element according to claim 1, wherein said fibrous material is made of TiC, TaC, WC or ZrC and is in the form of fiber, filament, non-woven fabric or mat.

8. The composite electrode element according to claim 1, wherein said fibrous material is made of TiN in the form of fiber, filament, non-woven fabric or mat.

9. The composite electrode element according to claim 1, wherein said fibrous material is made of B, $ZrB_2$, $HfB_2$ or $TiB_2$ and is in the form of fiber, filament, non-woven fabric or mat.

10. The composite electrode element according to claim 1, wherein said fibrous material is made of TiN in the form of whisker.

11. The composite electrode element according to claim 1, wherein said fibrous material is made of SiC, $Nb_2C$ or $B_4C$ and is in the form of whisker.

12. The composite electrode element according to claim 1, wherein said matrix is composed of a $ZrO_2$ system, a $CeO_2$ system, a MgO system or a complex oxide system.

13. The composite electrode element according to claim 1, wherein said matrix is composed of $ZrO_2$-$Y_2O_3$ in a molar ratio of 90–97:10–3, $ZrO_2$-$Y_2O_3$-$CeO_2$ in a molar ratio of 75–92:10–3:15–5, $ZrO_2$-$Y_2O_3$-$CeO_2$ in a molar ratio of 30–92:10–3:60–5, $ZrO_2$-$CeO_2$-$CaO$ in a molar ratio of 40–87:40–5:20–8, or $ZrO_2$-(MgO-Ca0) in a molar ratio of 80–92:20–8.

14. The composite electrode element according to claim 1, wherein said matrix is composed of $CeO_2$-$ZrO_2$ in a molar ratio of 15–80:85–20, $CeO_2$-$Ta_2O_5$ in a molar ratio of 60–90:40–10 or $CeO_2$-$ZrO_2$-$Ta_2O_5$ in a molar ratio of 20–50:70–48:10–2.

15. The composite electrode element according to claim 1, wherein said matrix is composed of MgO, MgO-CaO in a molar ratio of 70–90:30–10, MgO-$Al_2O_3$ in a molar ratio of 70–95:30–5, MgO-$Fe_2O_3$ in a molar ratio of 85–97:15–3, or MgO-$ZrO_2$ in a molar ratio of 80–93:20–7.

16. The composite electrode element according to claim 1, wherein said matrix is composed of $Al_2O_3$-($Fe_2O_3$-$SiO_2$) in a molar ratio of 70–90:30–10, MgO-($Al_2O_3$-$Fe_2O_3$-$SiO_2$) in a molar ratio of 60–80:40–20, MgO- $Si_3N_4$ in a molar ratio of 70–90:30–10, $(ZrO_2-MgO)$-SiC in a molar ratio of 80–95:20–5, $(ZrO_2-MgO)$-C in a molar ratio of 80–95:20–5, $(ZrO_2-CeO_2)$-SiC in a molar ratio of 80–95:20–5, $(ZrO_2-CeO_2)$-C in a molar ratio of 80–95:20–5, $(ZrO_2-CaO-MgO)$-SiC in a molar ratio of 80–95:20–5, $(ZrO_2-CaO-MgO)$-C in a molar ratio of 80–95:20–5, $(ZrO_2-Y_2O_3)$-SiC in a molar ratio of 80–95:20–5 or $(ZrO_2-Y_2O_3)$-C in a molar ratio of 80–95:20–5.

17. The composite electrode element according to claim 1, wherein said matrix is composed of SiC, TaC or ZrC.

18. The composite electrode element according to claim 1, wherein said matrix is composed of $Si_3N_4$ or TiN.

19. The composite electrode element according to claim 1, wherein said matrix is composed of $ZrB_2$, $HfB_2$ or $TiB_2$.

20. The composite electrode element according to claim 1, wherein the element is formed in the shape of a plate-like block.

21. The composite electrode according to claim 20, wherein said plate-like block has a thickness of 2–15 mm and the length of each of its sides falls in the range of 5–50 mm.

22. The composite electrode element according to claim 20, wherein said fibrous material is oriented at right angles relative to the plate surfaces of said plate-like block.

23. The composite electrode element according to claim 20, wherein said fibrous material is oriented in parallel to the plate surfaces of said plate-like block.

24. The composite electrode element according to claim 22, wherein the density of said fibrous material is gradually decreased from one side to the other side in the direction of the width of said plate-like block.

25. The composite electrode element according to claim 23, wherein the density of said fibrous material is gradually decreased from one side to the other side in the direction of the width of said plate-like block.

26. The composite electrode element according to claim 22, wherein said fibrous material on one plate surface side of said plate-like block is SiC, C, TC, WC or TiN having low electrical resistivity and that on the other plate surface side thereof is $Si_3N_4$, MgO, $Al_2O_3$, $ZrO_2$-CaO in a molar ratio of 85–92:15–8, $ZrO_2$-MgO in a molar ratio of 85–93:15–7, $ZrO_2$-$Y_2O_3$ in a molar ratio of 90–97:10–3, $ZrO_2$-(MgO-CaO) in a molar ratio of 85–93:15–7, $ZrO_2$-(MgO-$Y_2O_3$) in a molar ratio of 85–97:15–3, $Zro_2$-(CaO-$Y_2O_3$) in a molar ratio of 85–97:15–3 or $Zro_2$-(MgO-CaO-$Y_2O_3$) in a molar ratio of 85–96:15–4 having high electrical resistivity.

27. The composite electrode element according to claim 23, wherein said fibrous material on one plate surface side of said plate-like block is SiC, C, TC, WC or TiN having low electrical resistivity and that on the other plate surface thereof is $Si_3N_4$, MgO, $Al_2O_3$, $ZrO_2$-CaO in a molar ratio of 85–92:15–8, $ZrO_2$-MgO in a molar ratio of 85–93:15–7, $ZrO_2$-$Y_2O_3$ in a molar ratio of 90–97:10–3, $ZrO_2$-(MgO-CaO) in a molar ratio of 85–93:15–7, $ZrO_2$-(MgO-$Y_2O_3$) in a molar ratio of 85–97:15–3, $ZrO_2$-(CaO-$Y_2O_3$) in a molar ratio of 85–97:15–3 or $ZrO_2$-(MgO-CaO-$Y_2O_3$) in a molar ratio of 85–96:15–4 having high electrical resistivity.

28. The composite electrode element according to claim 20, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

29. The composite electrode according to claim 22, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

30. The composite electrode element according to claim 23, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

31. The composite electrode element according to claim 24, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

32. The composite electrode element according to claim 25, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

33. The composite electrode element according to claim 26, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

34. The composite electrode element according to claim 27, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

35. The composite electrode element according to claim 28, further comprising a cooling block disposed under said supporting plate and made of Cu, Ni, Cu-Ni or Fe-Ni-Cr.

36. The composite electrode element according to claim 29, further comprising a cooling block disposed under said supporting plate and made of Cu, Ni, Cu-Ni or Fe-Ni-Cr.

37. The composite electrode element according to claim 30, further comprising a cooling block disposed under said supporting plate and made of Cu, Ni, Cu-Ni or Fe-Ni-Cr.

38. The composite electrode element according to claim 31, further comprising a cooling block disposed under said supporting plate and made of Cu, Ni, Cu-Ni or Fe-Ni-Cr.

39. The composite electrode element according to claim 32, further comprising a cooling block disposed under said supporting plate and made of Cu, Ni, Cu-Ni or Fe-Ni-Cr.

40. The composite electrode element according to claim 33, further comprising a cooling block disposed under said supporting plate and made of Cu, Ni, Cu-Ni or Fe-Ni-Cr.

41. The composite electrode element according to claim 34, further comprising a cooling block disposed under said supporting plate and made of Cu, Ni, Cu-Ni or Fe-Ni-Cr.

42. The composite electrode element according to claim 28, further comprising a compliant layer disposed under said supporting plate and made of Ni, Ni-Cr, Ni-Cu or noble metals.

43. The composite electrode element according to claim 29, further comprising a compliant layer disposed under said supporting plate and made of Ni, Ni-Cr, Ni-Cu or noble metals.

44. The composite electrode element according to claim 30, further comprising a compliant layer disposed under said supporting plate and made of Ni, Ni-Cr, Ni-Cu or noble metals.

45. The composite electrode element according to claim 31, further comprising a compliant layer disposed under said supporting plate and made of Ni, Ni-Cr, Ni-Cu or noble metals.

46. The composite electrode element according to claim 32, further comprising a compliant layer disposed under said supporting plate and made of Ni, Ni-Cr, Ni-Cu or noble metals.

47. The composite electrode element according to claim 33, further comprising a compliant layer disposed under said supporting plate and made of Ni, Ni-Cr, Ni-Cu or noble metals.

48. The composite electrode element according to claim 34, further comprising a compliant layer disposed under said supporting plate and made of Ni, Ni-Cr, Ni-Cu or noble metals.

49. The composite electrode element according to claim 35, further comprising a compliant layer made of Ni, Ni-Cr, Ni-Cu or noble metals between said supporting plate and said cooling block.

50. The composite electrode element according to claim 20, further comprising a compliant layer, a bonding layer disposed between said plate-like block and said compliant layer, and a cooling block disposed under said compliant layer.

51. The composite electrode element according to claim 22, further comprising a compliant layer, a bonding layer disposed between said plate-like block and said compliant layer, and a cooling block disposed under said compliant layer.

52. The composite electrode element according to claim 23, further comprising a compliant layer, a bonding layer disposed between said plate-like block and said compliant layer, and a cooling block disposed under said compliant layer.

53. The composite electrode element according to claim 24, further comprising a compliant layer, a bonding layer disposed between said plate-like block and said compliant layer, and a cooling block disposed under said compliant layer.

54. The composite electrode element according to claim 25, further comprising a compliant layer, a bonding layer disposed between said plate-like block and said compliant layer, and a cooling block disposed under said compliant layer.

55. The composite electrode element according to claim 26, further comprising a compliant layer, a bonding layer disposed between said plate-like block and said compliant layer, and a cooling block disposed under said compliant layer.

56. The composite electrode element according to claim 27, further comprising a compliant layer, a bonding layer disposed between said plate-like block and said compliant layer, and a cooling block disposed under said compliant layer.

57. The composite electrode element according to claim 28, further comprising side walls rising from opposite sides of said supporting plate to a height at least one fourth of the thickness of said plate-like block.

58. The composite electrode element according to claim 29, further comprising side walls rising from opposite sides of said supporting plate to a height at least one fourth of the thickness of said plate-like block.

59. The composite electrode element according to claim 30, further comprising side walls rising from opposite sides of said supporting plate to a height at least one fourth of the thickness of said plate-like block.

60. The composite electrode element according to claim 31, further comprising side walls rising from opposite side of said supporting plate to a height at least one fourth of the thickness of said plate-like block.

61. The composite electrode element according to claim 32, further comprising side walls rising from opposite sides of said supporting plate to a height at least one fourth of the thickness of said plate-like block.

62. The composite electrode element according to claim 33, further comprising side walls rising from opposite sides of said supporting plate to a height at least one fourth of the thickness of said plate-like block.

63. The composite electrode element according to claim 34, further comprising side walls rising from opposite sides of said supporting plate to a height at least one fourth of the thickness of said plate-like block.

64. A composite wall element for a magnetohydrodynamic power generating channel, comprising a matrix composed of at least one member selected from the group consisting of oxide, nitride and boride and a fibrous material composed of at least one member selected from the group consisting of carbon, graphite, oxide, carbide, nitride and boride, said fibrous material being embedded in said matrix and unified with said matrix so as to form a composite.

65. The composite wall element according to claim 64, wherein said fibrous material is in the form of fiber, filament, non-woven fabric, mat or whisker.

66. The composite wall element according to claim 64, wherein the amount of said fibrous material is 5 to 40% by volume based on the total volume of the composite wall element.

67. The composite wall element according to claim 64, wherein the amount of said fibrous material is 5 to 20% by volume based on the total volume of the composite wall element.

68. The composite wall element according to claim 64, wherein said fibrous material is made of $Al_2O_3$, MgO, stabilized Zr, $SiO_2$ or $MgO-SiO_2$ in a molar ratio of 5-95:95-5 and is in the form of fiber, filament, non-woven fabric or mat.

69. The composite wall element according to claim 64, wherein said fibrous material is made of a $ZrO_2$ system, a complex spinel system or a complex oxide system and is in the form of fiber, filament, non-woven fabric or mat.

70. The composite wall element according to claim 64, wherein said fibrous material is made of $ZrO_2$-CaO in a molar ratio of 85-92:15-8, $ZrO_2$-MgO in a molar ratio of 85-93:15-7, $ZrO_2$-$Y_2O_3$ in a molar ratio of 90-97:10-3, $ZrO_2$-(MgO-CaO) in a molar ratio of 42-85:58-15, $ZrO_2$-(MgO-$Y_2O_3$) in a molar ratio of 85-97:15-3, $ZrO_2$-(CaO-$Y_2O_3$) in a molar ratio of 85-96:15-4 or $ZrO_2$-(MgO-CaO-$Y_2O_3$) in a molar ratio of 85-96:15-4 and is in the form of fiber, filament, non-woven fabric or mat.

71. The composite wall element according to claim 64, wherein said fibrous material is made of $3FeAl_2O_4$-

$Fe_3O_4$ in a molar ratio of 25–75:75–25 or $4MgAl_2O_4$-$Fe_3O_4$ in a molar ratio of 60–80:40–20 and is in the form of fiber, filament, non-woven fabric or mat.

72. The composite wall element according to claim 64, wherein said fibrous material is made of $MgAl_2O_4$-$SiO_2$ in a molar ratio of 70–90:30–10 or $Al_2O_3$-$SiO_2$ in a molar ratio of 5–95:95–5 and is in the form of fiber, filament, non-woven fabric or mat.

73. The composite wall element according to claim 64, wherein said fibrous material is made of BN or $Si_3N_4$ and is in the form of fiber, filament, non-woven fabric or mat.

74. The composite wall element according to claim 64, wherein said fibrous material is made of $ZrO_2$-CaO in a molar ratio of 85–92:15–8, $ZrO_2$-MgO in a molar ratio of 85–93:15–7, $ZrO_2$-$Y_2O_3$ in a molar ratio of 90–97:10–3, $ZrO_2$-(MgO-CaO) in a molar ratio of 85–93:15–7, $ZrO_2$-(MgO-$Y_2O_3$) in a molar ratio of 85–96:15–4, $ZrO_2$-(CaO-$Y_2O_3$) in a molar ratio of 85–96:15–4, $ZrO_2$-(MgO-CaO-$Y_2O_3$) in a molar ratio of 85–96:15–4, MgO or $Al_2O_3$ and is in the form of whisker.

75. The composite wall element according to claim 64, wherein said fibrous material is made of $Si_3N_4$ or BN and is in the form of whisker.

76. The composite wall element according to claim 64 wherein said matrix is composed of a $ZrO_2$ system, a MgO system, a complex spinel system or a complex oxide system.

77. The composite wall element according to claim 64, wherein said matrix is composed of $ZrO_2$-$Y_2O_3$ in a molar ratio of 90–97:10–3, $ZrO_2$-$Y_2O_3$-$CeO_2$ in a molar ratio of 75–92:10–3:15–5, $ZrO_2$-$Y_2O_3$-$CeO_2$ in a molar ratio of 30–92:10–3:60–5, $ZrO_2$-$CeO_2$-CaO in a molar ratio of 40–87:40–5:20–8, or $ZrO_2$-(MgO-CaO) in a molar ratio of 80–92:20–8.

78. The composite wall element according to claim 64, wherein said matrix is composed of MgO, MgO-CaO in a molar ratio of 70–90:30–10, MgO-$Al_2O_3$ in a molar ratio of 70–95:30–5, MgO-$Fe_2O_3$ in a molar ratio of 85–97:15–3, or MgO-$ZrO_2$ in a molar ratio of 80–93:20–7.

79. The composite wall element according to claim 64, wherein said matrix is composed of $3FeAl_2O_4$-$Fe_3O_4$ in a molar ratio of 25–75:75–25 or $4MgAl_2O_4$-$Fe_3O_4$ in a molar ratio of 60–80:40–20.

80. The composite wall element according to claim 64, wherein said matrix is composed of $Al_2O_3$-($Fe_2O_3$-$SiO_2$) in a molar ratio of 70–90:30–10, MgO-($Al_2O_3$-$Fe_2O_3$-$SiO_2$) in a molar ratio of 60–80:40–20, MgO-$Si_3N_4$ in a molar ratio of 70–90:30–10, ($ZrO_2$-MgO)-SiC in a molar ratio of 80–95:20–5, ($ZrO_2$-MgO)-C in a molar ratio of 80–95:20–5, ($ZrO_2$-$CeO_2$)-SiC in a molar ratio of 80–95:20–5, ($ZrO_2$-$CeO_2$)-C in a molar ratio of 80–95:20–5, ($ZrO_2$-CaO-MgO)-SiC in a molar ratio of 80–95:20–5, ($ZrO_2$-CaO-MgO)-C in a molar ratio of 80–95:20–5, ($ZrO_2$-$Y_2O_3$)-SiC in a molar ratio of 80–95:20–5 or ($ZrO_2$-$Y_2O_3$)-C in a molar ratio of 80–95:20–5.

81. The composite wall element according to claim 64, wherein said matrix is composed of $Si_3N_4$ or TiN.

82. The composite wall element according to claim 64, wherein the element is formed in the shape of a plate-like block.

83. The composite wall element according to claim 82, wherein said plate-like block has a thickness of 2–15 mm and the length of each of its sides falls in the range of 10–25 mm.

84. The composite wall element according to claim 82, wherein said fibrous material is oriented at right angles relative to the plate surfaces of said plate-like block.

85. The composite wall element according to claim 82, wherein said fibrous material is oriented in parallel to the plate surfaces of said plate-like block.

86. The composite wall element according to claim 84, wherein the density of said fibrous material is gradually decreased in the direction of the thickness of said plate-like block.

87. The composite wall element according to claim 85, wherein the density of said fibrous material is gradually decreased in the direction of the thickness of said plate-like block.

88. The composite wall element according to claim 82, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

89. The composite wall element according to claim 84, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

90. The composite wall element according to claim 85, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

91. The composite wall element according to claim 86, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

92. The composite wall element according to claim 87, further comprising a supporting plate made of Ni, Cu, Cu alloys or noble metals and a bonding layer made of Ni, Cu, Cu alloys, noble metals, metal oxides or glass frit for connecting said supporting plate with said plate-like block.

93. The composite wall element according to claim 88, further comprising a cooling block disposed under said supporting plate and made of Cu, Ni, Cu-Ni or Fe-Ni-Cr.

94. The composite wall element according to claim 89, further comprising a cooling block disposed under said supporting plate and made of Cu, Ni, Cu-Ni or Fe-Ni-Cr.

95. The composite wall element according to claim 90, further comprising a cooling block disposed under said supporting plate and made of Cu, Ni, Cu-Ni or Fe-Ni-Cr.

96. The composite wall element according to claim 91, further comprising a cooling block disposed under said supporting plate and made of Cu, Ni, Cu-Ni or Fe-Ni-Cr.

97. The composite wall element according to claim 92, further comprising a cooling block disposed under said supporting plate and made of Cu, Ni, Cu-Ni or Fe-Ni-Cr.

98. The composite wall element according to claim 88, further comprising a compliant layer disposed under said supporting plate and made of Ni, Ni-Cr, Ni-Cu or noble metals.

99. The composite wall element according to claim 89, further comprising a compliant layer disposed under said supporting plate and made of Ni, Ni-Cr, Ni-Cu or noble metals.

100. The composite wall element according to claim 90, further comprising a compliant layer disposed under said supporting plate and made of Ni, Ni-Cr, Ni-Cu or noble metals.

101. The composite wall element according to claim 91, further comprising a compliant layer disposed under said supporting plate and made of Ni, Ni-Cr, Ni-Cu or noble metals.

102. The composite wall element according to claim 92, further comprising a compliant layer disposed under said supporting plate and made of Ni, Ni-Cr, Ni-Cu or noble metals.

103. The composite wall element according to claim 88, further comprising a compliant layer made of Ni, Ni-Cr, Ni-Cu or noble metal between said supporting plate and said cooling block.

104. The composite wall element according to claim 82, further comprising a compliant layer, a bonding layer disposed between said plate-like block and said compliant layer, and a cooling block disposed under said compliant layer.

105. The composite wall element according to claim 84, further comprising a compliant layer, a bonding layer disposed between said plate-like block and said compliant layer, and a cooling block disposed under said compliant layer.

106. The composite wall element according to claim 85, further comprising a compliant layer, a bonding layer disposed between said plate-like block and said compliant layer, and a cooling block disposed under said compliant layer.

107. The composite wall element according to claim 86, further comprising a compliant layer, a bonding layer disposed between said plate-like block and said compliant layer, and a cooling block disposed under said compliant layer.

108. The composite wall element according to claim 87, further comprising a compliant layer, a bonding layer disposed between said plate-like block and said compliant layer, and a cooling block disposed under said compliant layer.

109. The composite wall element according to claim 88, further comprising side walls rising from opposite sides of said supporting plate to a height at least one fourth of the thickness of said plate-like block.

110. The composite wall element according to claim 89, further comprising side walls rising from opposite sides of said supporting plate to a height at least one fourth of the thickness of said plate-like block.

111. The composite wall element according to claim 90, further comprising side walls rising from opposite sides of said supporting plate to a height at least one fourth of the thickness of said plate-like block.

112. The composite wall element according to claim 91, further comprising side walls rising from opposite sides of said supporting plate to a height at least one fourth of the thickness of said plate-like block.

113. The composite wall element according to claim 92, further comprising side walls rising from opposite sides of said supporting plate to a height at least one fourth of the thickness of said plate-like block.

* * * * *